Aug. 6, 1968  J. W. DODGEN ETAL  3,395,868
ROLLER MILL
Original Filed Nov. 20, 1963  5 Sheets-Sheet 1
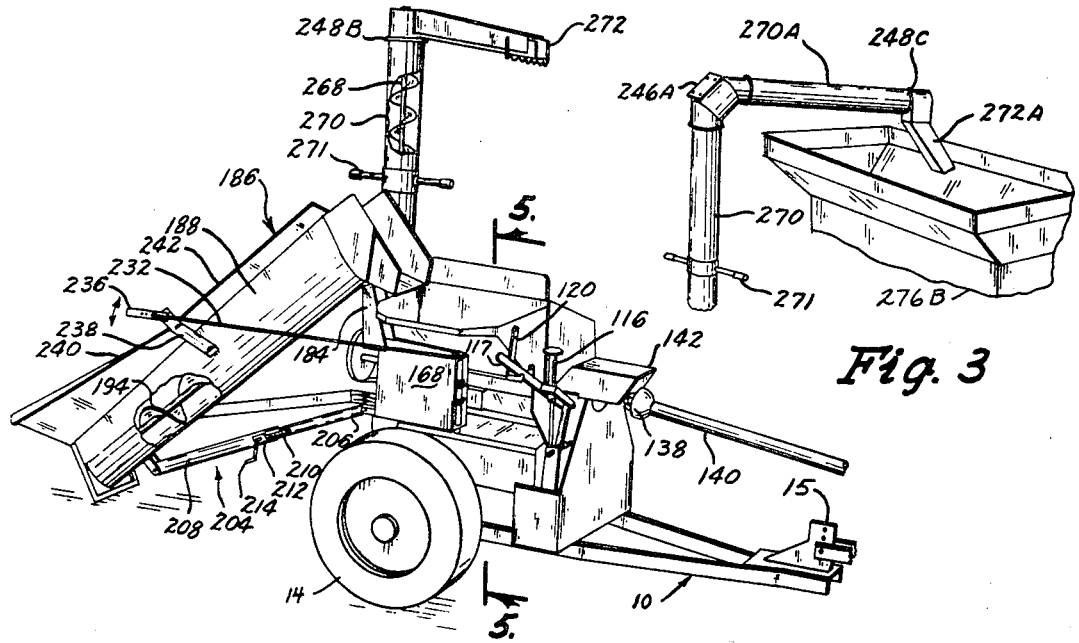
Fig. 3
Fig. 1
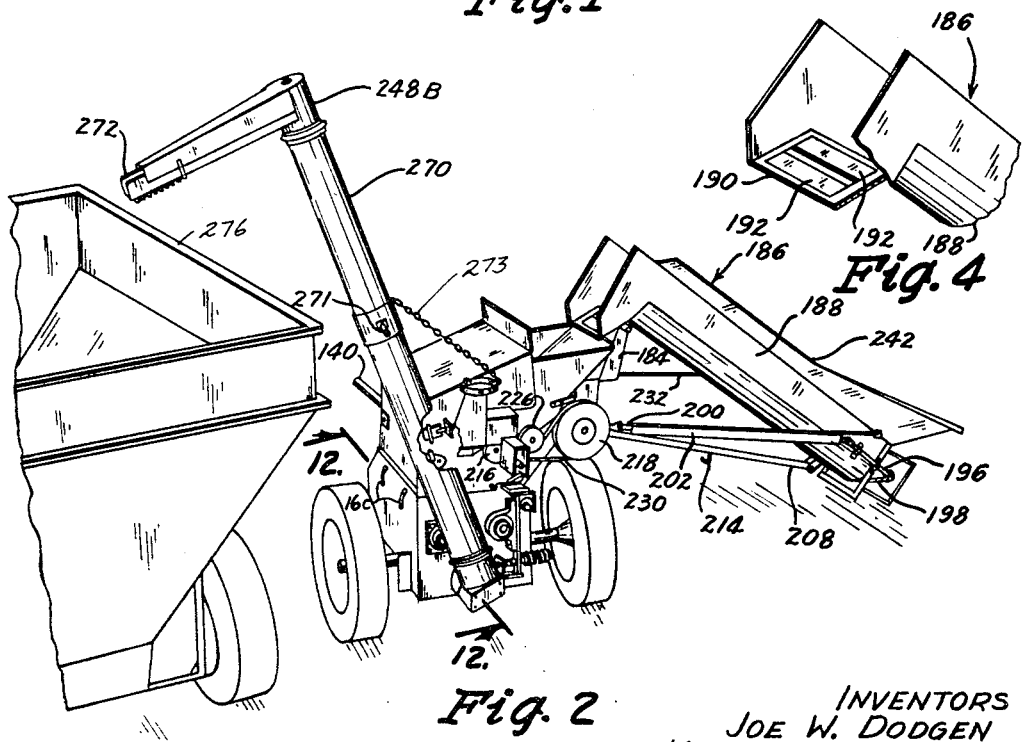
Fig. 4
Fig. 2
INVENTORS
JOE W. DODGEN
KENNETH R. JOHNSON
MERTON D. SNAPP
BY
Dick, Zarley, McKee & Thomte
ATTORNEYS

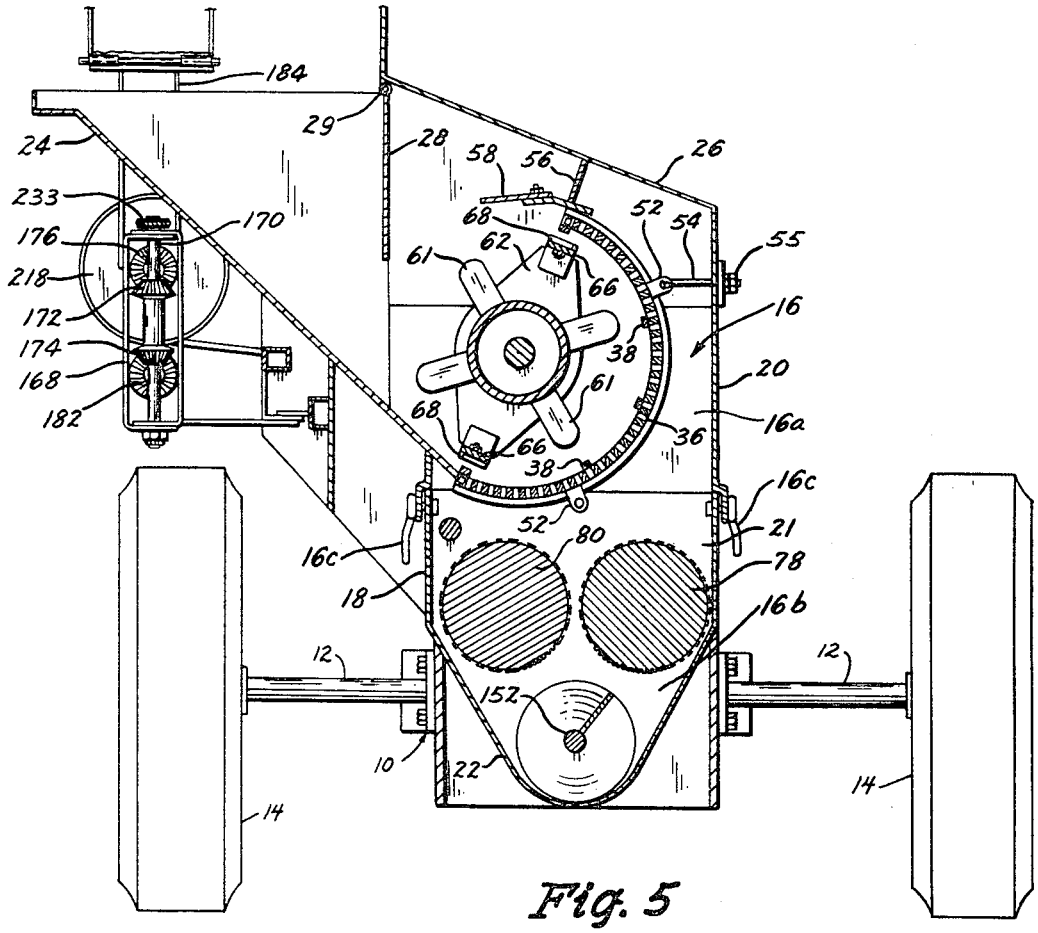
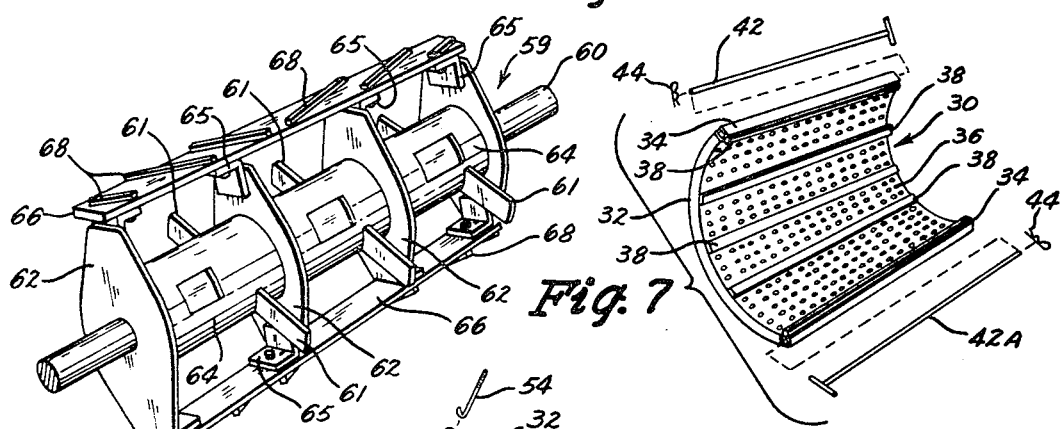
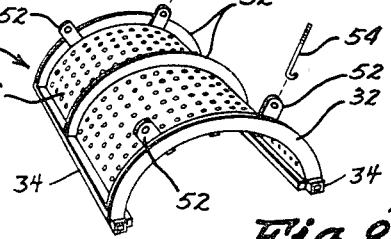

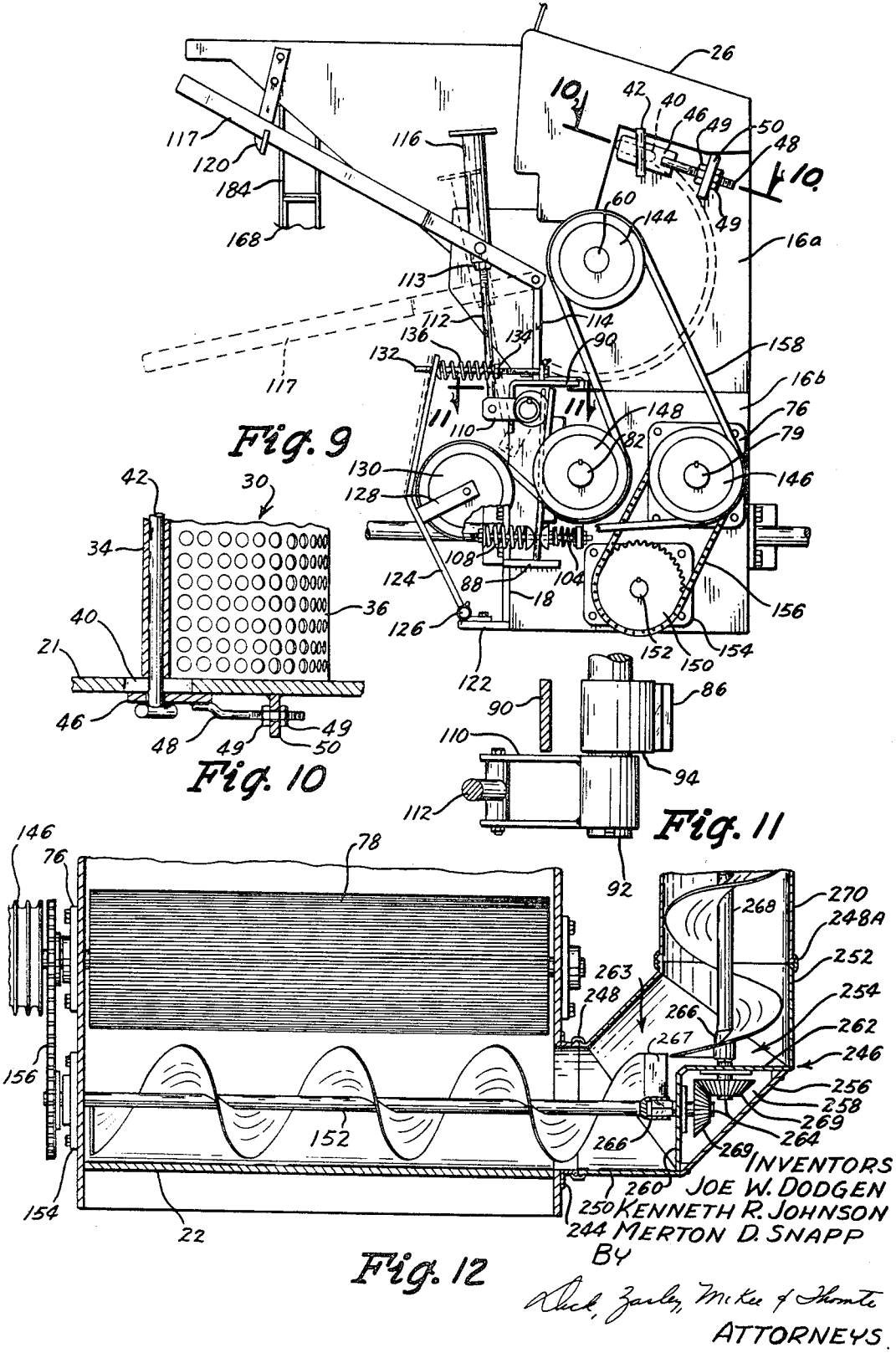

INVENTORS
JOE W. DODGEN
KENNETH R. JOHNSON
MERTON D. SNAPP

BY

ATTORNEYS

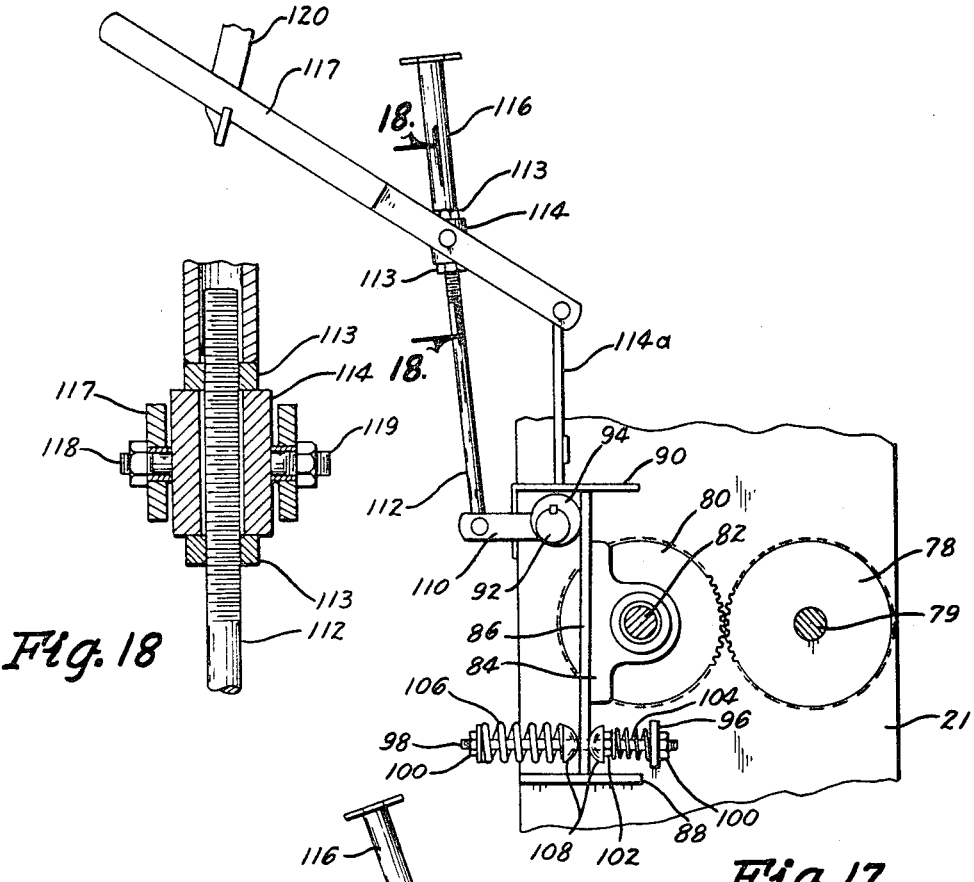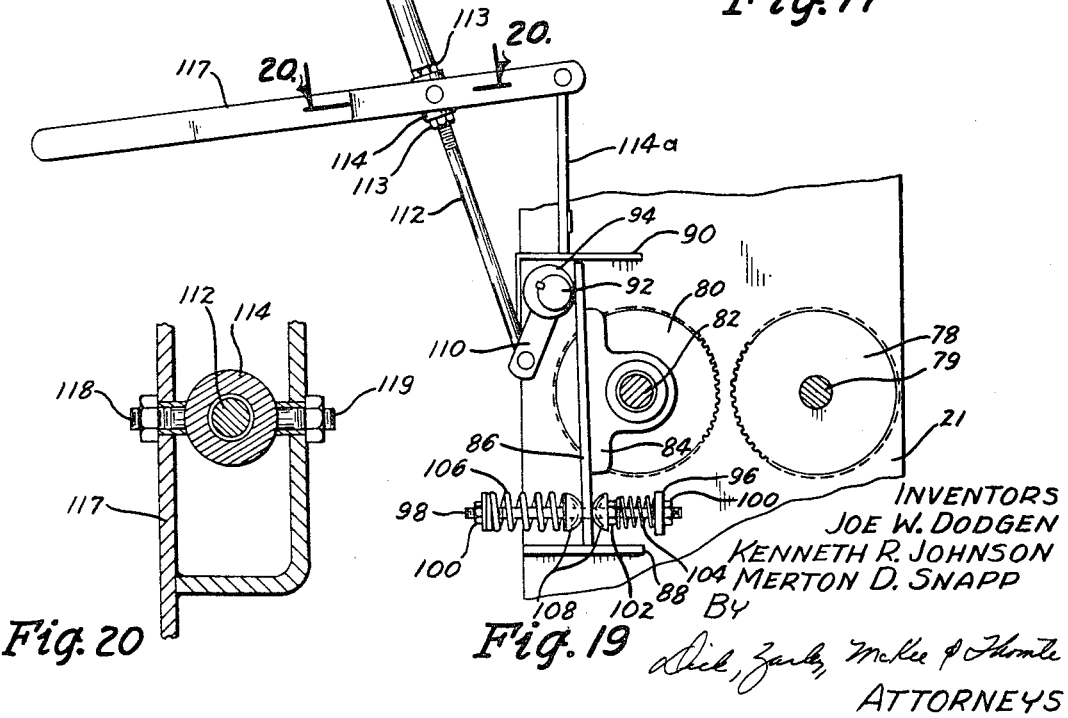

United States Patent Office 3,395,868
Patented Aug. 6, 1968

3,395,868
ROLLER MILL
Joe W. Dodgen, Kenneth R. Johnson, and Merton D. Snapp, Humboldt, Iowa, assignors to Dodgen Industries, Inc., Humboldt, Iowa, a corporation of Iowa
Original application Nov. 20, 1963, Ser. No. 325,117, now Patent No. 3,194,288, dated July 13, 1965. Divided and this application May 3, 1965, Ser. No. 452,687
3 Claims. (Cl. 241—86)

ABSTRACT OF THE DISCLOSURE

A roller mill having a power transmission assembly including a pair of channel members in registering nesting end to end engagement and pivotally interconnected by a vertical shaft having a pair of gears thereon in engagement with longitudinally extending horizontal shafts carried by the channel members. A rotor in a grinding compartment may be connected to one of the horizontal shafts for driving a conveyor connected to the other of said horizontal shafts.

---

This is a divisional application of the application filed Nov. 20, 1963, Ser. No. 325,117, now Patent No. 3,194,288.

This invention pertains to a roller mill unit which preconditions various types of grains for feeding purposes, and reduces the material from its original size or shape to a predetermined particle size. This invention particularly relates to the type of machine that can pre-digest such objects as ear corn by means of a rotor acting in conjunction with an arcuate screen, whereupon the shredded material moves between rotating grinding rolls to complete the operation.

A principal object of this invention is to provide a roller mill that presents a progressively narrower path and thence a progressively wider path for the material being treated as it moves from the point of entry to the discharge point in the space between the rotor and screen.

A further object of this invention is to provide a roller mill wherein the roll units can be adjustably spaced, and can also be selectively operated without changing the predetermined adjustment.

A still further object of this invention is to provide a roller mill with an auxiliary power transmittal means which can power both a feed loading mechanism and a feed discharge mechanism.

A still further object of this invention is to provide a roller mill with an auxiliary power transmittal means which utilizes an idler shaft in the power train which is substantially free from end thrust.

A still further object of this invention is to provide a roller mill wherein the elbows, augers, auger tubes and spouts used in the feed conveying means can be interchanged with respective corresponding parts to add flexibility to the exact design of the resulting unit, and to permit additional auger sections to be added, for example, by merely duplicating like parts. The fulfillment of this object obviously reduces the number of different parts required to meet all of the different design possibilities.

A still further object of this invention is to provide a roller mill which is simple in design, economical to manufacture and refined in appearance.

These and other objects will be apparent to those skilled in the art.

Figure 13:
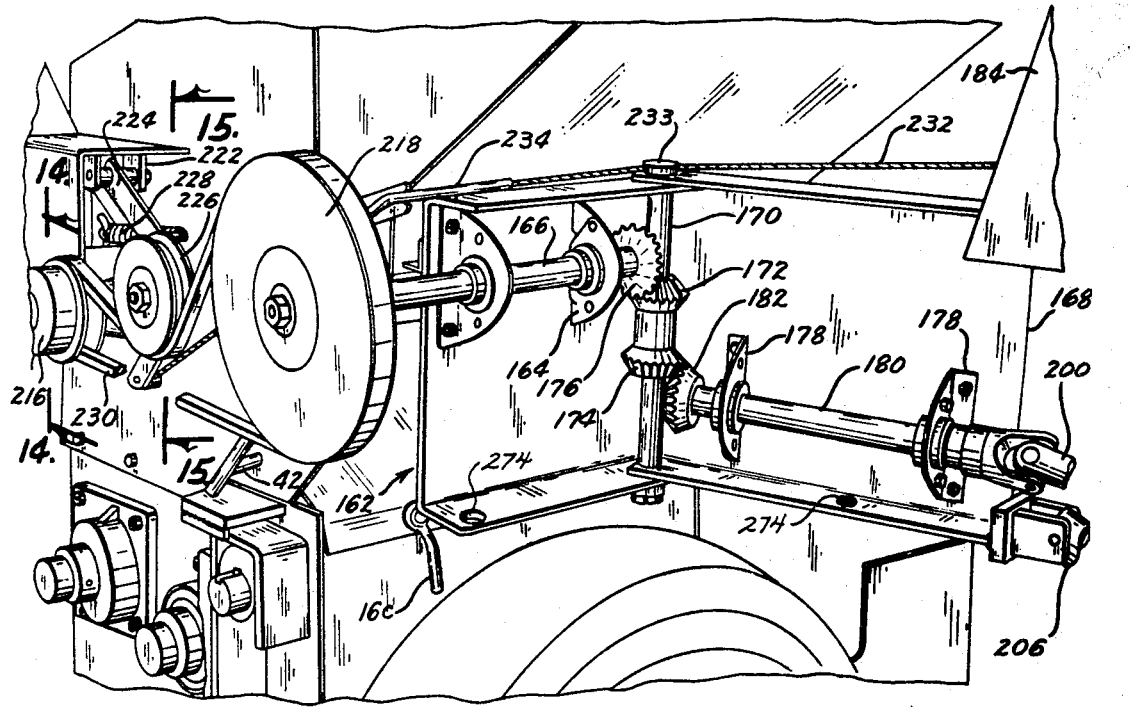
Figure 14:
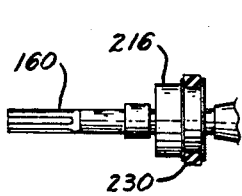
Figure 15:
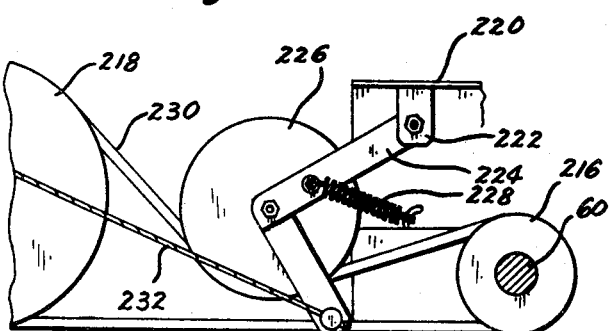
Figure 16:
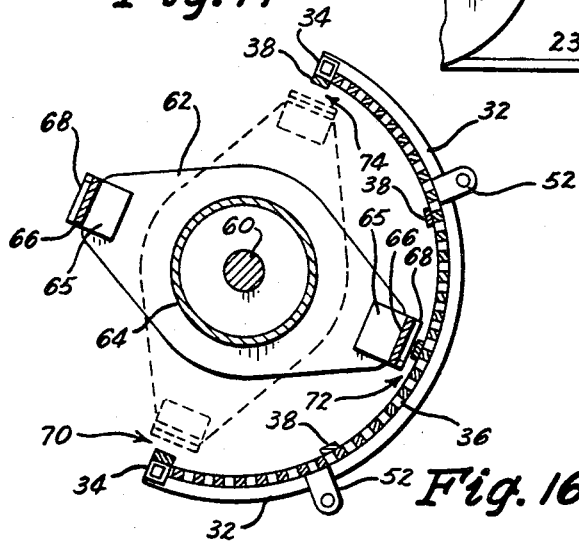

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a perspective view of the roller mill in one of its operating positions;
FIG. 2 is a perspective view of the left hand side of the roller mill as shown in FIG. 1, but shows the roller mill in a second possible operating position;
FIG. 3 is a perspective view of an alternate form of discharge conduit;
FIG. 4 is a perspective view of the upper end of the feeding chute;
FIG. 5 is a sectional view of the roller mill taken on line 5—5 of FIG. 1;
FIG. 6 is a perspective view of the rotor unit;
FIG. 7 is a schematic perspective view of the screen unit and its retaining rods;
FIG. 8 is a schematic perspective view of the reverse side of the screen unit and its anchoring hooks;
FIG. 9 is an elevational view of the right hand end of the roller mill as viewed in FIG. 1 with the protective cover removed therefrom;
FIG. 10 is a partial sectional view of the roller mill unit taken on line 10—10 of FIG. 9, and shows the screen adjustment means;
FIG. 11 is a partial perspective view of the roller mill unit taken on line 11—11 of FIG. 9 and shows the adjustment control shaft for the roll units with the control lever secured thereto;
FIG. 12 is a partial sectional view of the roller mill taken on line 12—12 of FIG. 2;
FIG. 13 is a partial perspective view of the auxiliary power transmission means showing the power train for the feed supply means when the unit is in an operating position similar to that of FIG. 2;
FIG. 14 is a side elevational view of the free end of the protruding rotor shaft as viewed on line 14—14 of FIG. 13;
FIG. 15 is a partial sectional view of the roller mill taken on line 15—15 of FIG. 13 and illustrates the means by which the feed supply means is controlled;
FIG. 16 is an enlarged scale end view of the rotor in its normal operating position with respect to the screen unit;
FIG. 17 is an end elevational view of the roller mill similar to that of FIG. 9 but has portions thereof cut away to more fully illustrate the roll control means as viewed on line 18—18 of FIG. 17;
FIG. 18 is a sectional view of the fine adjustment roll control means as viewed in line 18—18 of FIG. 17;
FIG. 19 is a view similar to that of FIG. 17 with the control lever in a position to spread the roll elements; and
FIG. 20 is a sectional view of the fine adjustment roll control means as viewed in line 20—20 of FIG. 19.

The numeral 10 designates a suitable frame with axle shafts 12 extending laterally from each side thereof. Wheels 14 on shafts 12 support the frame, and a towing means 15 is secured to the forward end thereof. A compartment 16 is formed by parallel side walls 18 and 20 which are enclosed by end walls 21. The compartment 16 includes an upper ear corn head compartment 16a which detachably rests on and is secured to the lower roller compartment 16 by elements 16c. Like reference numerals are used for the walls of both compartments. Wall 18 is shorter than wall 20. The lower portion 22 of compartment 16 terminates in a V-shaped portion, as shown in FIG. 5. An intake chute 24 extends upwardly and outwardly from the top of wall 18, and a hood 26 on the top of compartment 16 extends from the top of wall 20 to the open top portion of intake chute 24. A baffle plate 28 is pivotally supported by hinge 29 and extends vertically downwardly therefrom to partially yieldably close the throat of intake chute 24 as it communicates with compartment 16. An arcuate screen 30 is comprised of three parallel arcuate ribs 32 which have their ends rigidly secured to straight hollow tubes 34. A perforated arcuate plate 36 is welded or otherwise secured to the inner perimeters of ribs 32 and a plurality of straight spaced apart cutting bars 38 are rigidly secured to the inner peripheral surface of plate 36. With reference to FIGS. 9 and 10, elongated substantially horizontal slots 40 appear in the upper portions of end walls 21. A T-shaped rod 42 is adapted to extend through the slots 40 and one of the hollow tubes 34, and the upper end of the screen is thus being supported by the engagement of the ends of rod 42 in the slots. A cotter key or pin 44 detachable extends through a suitable aperture in the rods 42 (and 42A) to detachably keep the rods in place. The lower end of the screen 30 is similarly supported but the ends of the rod 42A extending through the other hollow tube 34 are positioned in apertures (not shown) in end walls 21 of compartment 16. These apertures are not slotted so screen 30 is pivotally mounted on this lower rod 42A, and its pivotal position can be adjusted through the arcuate length of slots 44. The ends of rod 42 extend through apertured bar 46 which in turn is welded to one end of threaded rod 48. The rods 48 extend through an apertured bracket 50 which is welded to end walls 21 of compartment 16. Stop nuts 49 are threadably secured to rod 48 at either side of bracket 50, and the position of the upper end of the screen 30 can be adjusted through the length of slots 40 by adjusting nuts 49 which moves the ends of rod 42 in the slots 40. It should be noted in FIGS. 5, 9 and 16 that the lower end of screen 30 is normally positioned in a forward location at the lower end of the intake chute 24, while the upper end of the screen is positioned above and rearwardly of the lower end.

Eyelets 52 are welded to the end ribs 32 and as shown in FIG. 5, hooks 54 are received in apertures in the eyelets, and the other ends of the hooks extend through wall 20. Adjusting nuts 55 on hooks 54 enable the tension exerted on the screen 30 by the hooks to be varied. The lower eyelets 52 (FIG. 5) will receive hooks 54 when screen 30 is in a reversed position.

A bracket 56 as shown in FIG. 5 extends downwardly from hood 26 and a baffle plate 58 is detachably secured thereto in a position tangentially to the upper edge of screen 30. The detachable aspects of plate 58 permit the rotor (to be discussed hereafter) to be more easily removed from compartment 16.

A rotor 59 including a horizontal shaft 60 is rotatably mounted near its end portions by suitable bearing means (not shown) in the end walls 21 of compartment 16. A plurality of spaced-apart substantially oval-shaped plates 62 are rigidly secured by welding or the like to shaft 60, and spacer tubes 64 are concentrically positioned on the shaft and are rigidly secured by their ends to adjacent plates. Two pairs of shredder bars 61 are rigidly secured to tubes 64 at points intermediate of plates 62. Bars 61 extend radially outwardly from shaft 60 and the bars of each pair are in alignment but are disposed at an angle to the longitudinal axis of plates 62. The pairs of bars between each pair of plates are angularly disposed with respect to each other. Plates 62 extend transversely from shaft 60 in the same direction and the outer ends thereof are clipped to assume a straight edge. Clip angles 65 are welded or otherwise secured to the outer ends of plates 62, and elongated cutting bars 66 are bolted to the clip angles at opposite ends of the plates. Bars 66 are preferably of cast metal, and diagonally disposed shear bars 68 are integrally formed therewith. As shown in FIG. 6, the diagonal positions of the shear bars 68 are symmetrical about the center of the cutting bars 66, but the diagonal positions on opposite sides of the center are reversed with respect to each other.

With reference to FIGS. 5 and 16, it is noted that the rotor 59 is disposed within screen 30 and that the clearance between the lowermost bar 38 of screen 30 and the pivotal arc of bars 66 on rotor 59 creates an intake opening or passage 70 which progressively narrows to a slight clearance at 72 adjacent the center of the screen. The passageway of the material between the rotor 59 and screen then becomes progressively wider until the discharge point 74 is of substantially the same size as the intake passage 70.

Opposed bearing elements 76 are rigidly secured to the lower portion of end walls 21 of compartment 16 at a point below screen 30. Roll 78 has its supporting shaft 79 rotatably mounted in the bearing elements 76. Roll 78 has a roughened or textured surface as shown in FIGS. 11, 17, and 19. A companion roll 80, which is identical to roll 78, has its supporting shaft 82 extending through suitable slots (not shown) in end walls 21 of compartment 16 so that the roll 80 can be moved towards or away from roll 78. Bearing elements 84 rotatably receive the outer ends of shaft 82, and these bearing elements are then welded or otherwise secured to vertical bars 86. The lower ends of bars 86 rest on horizontal plates 88 which are welded to walls 21 of compartment 16. The upper ends of bars 86 movably engage the horizontal flanges of clip angles 90 which are also welded to end walls 21.

A horizontal control shaft 92 rotatably extends through the forward lower portion of compartment 16, and cylindrical lugs 94 are rigidly and eccentrically secured to opposite ends thereof to provide a cam surface which is normally nestled between the vertical flanges of clip angles 90 and the forward faces of vertical bars 86. Rotation of shaft 92 causes the cam lugs 94 to move against the bars 86 to cause the bars, bearing elements 84 and roll 80 to move towards roll 78.

A bar 96 is welded to each of the end walls 21 of compartment 16 below roll 80, and rod 98 extends forwardly therethrough and movably protrudes through a suitable aperture in the lower ends of bars 86. Nuts 100 are threaded on opposite ends of rod 98, and an intermediate nut 102 is similarly mounted on the rod on the rearward side of the bars 86. A coil spring 104 is disposed on rod 98 between the intermediate nut 102 and bar 96, and spring 106 is similarly mounted on the other end of the rod on the forward side of bars 86. Cast iron washers 108 separate each of the springs from the bars 86. Spring 106 is more rigid than spring 104. The compression of spring 104 can be selectively adjusted by nut 102, and the function of this spring is to normally urge the bars 86 forwardly into engagement with the cam lugs 94. Springs 106 normally urge the bars 86 and roll 80 towards the opposing roll 78, but spring 106 can be compressed to permit immediate wtihdrawal of roll 80 from roll 78 if a hard piece of foreign material is accidentally passed through the roll units.

As shown in FIGS. 11, 17 and 19, a yoke 110 is rigidly secured to control shaft 92. Elongated rod 112 has its lower end pivotally secured to yoke 110, and its upper end threadably received in nuts 113 which are separated by and rigidly secured to hollow sleeve 114 (FIGS. 18 and 20). An elongated hollow sleeve 116 is welded to the upper end of the uppermost nut 113 and it is capable of receiving the upper end of rod 112. An upstanding post 114 is welded to clip angle 90 and the upper end of post 114 is pivotally secured to one end of yoke handle 117. The yoke handle then embraces sleeve 114 and is pivoted thereto by pin and backing assemblies 118 and 119. The downward movement of the handle 117 is releasably restrained by latch element 120 (FIGS. 1 and 17) which is secured to the end of intake chute 24. The position of roll 80 with respect to roll 78 can be finely adjusted by the fine adjustment means comprised of rod 112 and its related structure. By rotating sleeve 116 in one direction, rod 112 can be raised (or lowered), which imparts rotational movement to control shaft 92 and cam lugs 94. As described previously, the cam lugs 94, being eccentrically mounted on control shaft 92, move against the bars 86 to determine the position of roll 80 with respect to roll 78.

Once this fine adjustment has been predetermined for the type of feed being processed, the rolls 78 and 80 can be immediately separated by moving the yoke handle 117 downwardly from the position shown in FIG. 17 to the position shown in FIG. 19. When the yoke handle is returned to the position of FIG. 17, the fine predetermined adjusted position of the rolls 78 and 80 is immediately resumed without further adjustment.

A base angle 122 is welded or otherwise secured to the bottom of side wall 18 and a bent bar 124 extends upwardly therefrom and is pivotally secured thereto by hinge 126. U-shaped yoke 128 (FIG. 9) extends inwardly from bar 124 and idler pulley 130 is rotatably secured thereto. A horizontal rod 132 has its inner end rigidly secured to clip angle 90, and nut 134 is threadably mounted on the center portion thereof. The outer end of rod 132 extends through an aperture in the upper end of bar 124, and spring 136 separates nut 134 and the upper end of the bar. As shown in FIG. 1, a universal joint connector 138 is secured to one end of rotor shaft 60 to universally and detachably connect the shaft to a drive shaft 140. Drive shaft 140 can be connected to the power-take-off shaft of a tractor or the like. A shield 142 is detachably mounted by convenient means to end wall 21 to cover the joint connector 138.

As shown in FIG. 9, pulley wheels 144, 146 and 148 are rigidly mounted on the ends of shafts 60, 79 and 82, respectively, and are in alignment with idler pulley 130. A gear ring (not shown) is integral with the pulley wheel 146 and is in alignment with gear 150 which is rigidly secured to one end of auger shaft 152. Auger shaft 152 is supported by bearings 154 which in turn are secured to the lower portions of the end walls 21. The auger shaft extends through the V-shaped bottom portion 22 of compartment 16. A link chain 156 operatively connects the gear ring on pulley 146 and the gear 150. Continuous pulley belts 158 extend downwardly from pulley 144 around the rearward side of pulley 146 and thence underneath pulley 146; thence horizontally and forwardly underneath idler pulley 130; thence upwardly and over the forward side of the idler pulley; thence underneath pulley 148; and thence upwardly from pulley 148 towards and over pulley 144 to its point of beginning. The spring loaded idler pulley 130 serves to maintain tension in belts 158 as roll 80 is moved, as described above. As roll 80 moves toward roll 78, spring 136 is compressed, and bent bar 124 and pulley 130 move rearwardly or to the right, as viewed in FIG. 9. As roll 80 is moved forwardly and away from roll 78, spring 134 expands, and bar 124 and pulley 130 will then move forwardly to continue tension on the belts 158.

As shown in FIGS. 13 and 14, one end of rotor shaft 60 opposite to drive shaft 140 terminates in splined portion 160, which is adapted to receive suitable connectors so that auxiliary equipment can be powered. A U-shaped channel 162 is welded or otherwise secured to wall 18 of compartment 16 underneath intake chute 24. Bearing elements 164 rotatably support horizontal shaft 166. A second U-shaped channel 168 is oppositely disposed to channel 162 and the ends thereof are pivotally secured together by vertical shaft 170 in such a manner that the flanges of the two channels can close into an overlapping position. Separate bevel gears 172 and 174 are rigidly secured to shaft 170, and gear 172 meshes with gear 176 on the end of shaft 166. Bearing elements 178 on channel 168 rotatably support horizontal shaft 180, and gear 182 on the end thereof meshes with gear 174 on vertical shaft 170.

A bracket 184 is rigidly secured to the upper flange of channel 168 and is adapted to detachably receive in any convenient manner the upper end of supply loader 186. Loader 186 is comprised of an elongated body member 188 which is generally U-shaped in cross-section and has an upper end that terminates in a downwardly discharge plate 190. As indicated in FIG. 4, magnets 192 are secured to plate 190 to catch any metallic particles that may inadvertently move over the plate. An auger 194 is mounted within the body member 188. As shown in FIG. 2, an auxiliary power shaft 196 is rotatably connected to one side of body member 188, and a gear on the lower end thereof is connected to the lower end of auger 194 by link chain 198. A length adjustable drive shaft 200 has one of its ends secured to shaft 196 by a universal connector, and the upper end thereof is universally connected to shaft 180 on channel 168, as shown in FIG. 13. A length adjustable cover 202 houses shaft 200. Since they incorporate conventional structure, the length-adjustable structural features of shaft 200 and cover 202 have not been shown.

A jack 204 (FIG. 1) has its upper portion 206 pivotally connected to the lower portion of channel 168 as shown in FIG. 13. The lower end thereof slidably extends into elongated tube 208 which has its lower end pivotally secured to the lower underside portion of body member 188. A rack 210 is rigidly secured to portion 206 of jack 204, and the rack passes in operative engagement with a pinion 212 on tube 208, which is also operatively connected to crank 214. The crank 214 can be rotated to adjust the overall length of the jack, and hence, to adjust the inclined position of the supply loader 186.

With reference to FIGS. 13 and 15, a small pulley 216 is rigidly mounted on rotor shaft 60, and a larger pulley 218 is rigidly secured to shaft 166. A clip angle 220 is welded to wall 21 and yoke 222 extends downwardly therefrom. An L-shaped arm 224 is pivotally secured by one of its ends to yoke 222, and idler pulley 226 is rotatably secured to the apex thereof. Spring 228 interconnects angle 220 and L-shaped arm 224 to yieldingly resist the clockwise rotation of the arm, as viewed in FIG. 15. Continuous belt 230 extends underneath pulley 226, and thence around pulleys 216 and 218. A control cable 232 has one of its ends secured to the lower end of L-shaped arm 224, and is then threaded around the corner of compartment 16 through tube 234. Cable 232 then is threaded about guide element 233 on the upper end of shaft 170, and thence terminates in rigid connection on handle 236 (FIG. 1.) Handle 236 is pivotally secured to bracket 238, which in turn is secured to the center side portion of supply loader 186. When handle 236 is pivoted to one extreme position, it engages the top of side board 240 on loader 186. While in this position, the cable 232 rotates the L-shaped arm 224 (FIG. 15) clockwise and lifts it and pulley 226 upwardly to loosen belt 230. This action serves to stop the rotation of pulley 218 and related components to stop the rotation of the auger 194 in the loader 186. When handle 236 is rotated in an opposite direction, it engages the top of side board 242. This action slackens the tension in cable 232 and allows spring 228 to pull pulley 226 back into tight engagement with belt 230 so that the belt can once again rotate pulley 218 and actuate the power train connected thereto.

As shown in FIG. 12, auger shaft 152 extends through a collar 244 on one end of the V-shaped portion 22 of compartment 16, and an elbow tube 246 is rotatably secured to collar 244 by detachable circular ring 248. Elbow tube 246 includes a normally horizontal tube section 250; a vertical tube section 252, and a center diagonal tube section 254 that biases and interconnects sections 250 and 252. Plate 256 on center section 254 is removably secured thereto by bolts or the like so that access can be had to compartment 258 which is formed by vertical wall 260 and horizontal wall 262. Compartment 258 still leaves a material passageway 263 in the center tube section 254. Stub shafts 264 extend through suitable bearing means in each of the walls 260 and 262, and each of these shafts have a square outer end which is adapted to be received in auger shaft sockets 266 on auger shafts 152 and 268. A bar 267 on socket 266 of shaft 152 serves more feed material upwardly towards shaft 268. Bevel gears 269 on these shafts 264 operatively connect the shafts. Auger tube section 270 is rotatably secured to tube section 252 by detachable circular ring 248A. Handles 271 extend from tube 270 to facilitate its rotation. In FIG. 1, a material discharge spout 272 is detachably secured to the top of tube section 252 by ring 248B. In FIG. 3, an elbow tube 246A is rotatably mounted on the top of tube section 270, and a lateral tube 270A is secured thereto, with a material discharge spout 272A being rotatably mounted on the outer end thereof by ring 248C. Because of the identity between elbow tubes 246 and 246A; between tube sections 270 and 270A; and the connection means for spouts 272 and 272A, an implement dealer can supply a plurality of parts and be in a position to provide both the designs in FIGS. 1 and 2, without stocking special parts for each separate design. A sleeve and chain assembly 273 (FIG. 2) conventionally serve to adjustably maintain the tube 252 in the desired angular position.

The normal operation of the device of this invention is as follows: The traveling position of the unit is generally depicted in FIG. 1 except that the handle 236 would be in a position of engagement with the top of sideboard 240, and the jack 204 would have been actuated in the manner described to elevate the lower end of supply loader 186 out of engagement with the ground surface. It will be noted that the two channels 162 and 168 are closed upon each other. A pin (not shown) can extend through registering apertures 274 (FIG. 13) in the bottom flanges of the two channels to effect their temporary rigid connection. The overlapping travel position of the two channels creates an extremely strong unitary structure, and the closed position of these elements protect the gears thereon from mud and dirt.

When the unit is located at the place where the milling operation is to take place, such as depicted in FIG. 2, the channels 162 and 168 are disconnected in the manner described and channel 168 is pivoted to the position desired. Thus, in FIG. 2, the supply loader 186 has been rotated ninety degrees from the position in FIG. 1. The jack 204 is operated in the manner described to adjust loader 186 to the desired angle. The tube 270 is released from the sleeve of sleeve and chain assembly 273 and is rotated on collar 244 by means of elbow tube 246, to the desired angle. Sufficient links in the chain of assembly 273 are used to maintain tube 270 in a proper position that material can be discharged from spout 272 into wagon 276. Tube 270 is not necessarily so rotated during all operations and may be used in a vertical position. If it is desired to move the material a greater distance laterally from the machine than can be accommodated by the device of FIG. 2, ring 248B can be released so that spout 272 can be removed from tube 270. An elbow tube 246A can be rotatably placed on the top of tube 270 and movably held there by ring 248B, and tube 270A can extend laterally therefrom. The spout 272 (or a similar spout 272A) can then be mounted on the outer end of tube 270A to reach a second wagon 276B.

The control handle 117 which is used to move roll 80 towards and away from roll 78 can be moved to the upper position of FIG. 17. The machine operator, either through experience or through trial and error, can rotate sleeve 116 to create the precise adjustment desired as to the spacing of the rolls. The control handle is maintained in the uppermost position of FIG. 17 when the rolls are performing their grinding function, and the rolls can be substantially disengaged from operative coaction by moving the handle downward to the position of FIG. 19. However, whenever the handle 117 is moved upwardly again, the same fine adjustment of the rolls created by sleeve 116 is maintained, so the rolls do not need to be finely adjusted each time they are disengaged.

The drive shaft 140 is connected to the power-take-off shaft of a tractor, or to any other convenient power source. With reference to FIG. 9, the rotation of rotor shaft 60 by the power shaft 140 will cause rotation of shafts 79 and 82 (and hence, rolls 78 and 80) by means of belt 158. Tension in the belt will be maintained in the manner described by the operation of idler pulley 130 and its related structure. Auger shaft 152 is powered by shaft 79, chain 156 and gear 150. With reference to FIG. 12, auger shaft 152 conveys rotational power to the vertical auger shaft 268 through elbow tube 246. Similarly, auger shaft 268 can convey rotational power to the auger shaft within horizontal tube 270A through elbow tube 246A when the structure of FIG. 3 is employed.

With power being supplied to rotor shaft 60, handles 236 on loader 186 can be actuated in the manner described to permit idler pulley 226 (FIG. 15) to tighten belt 230. The rotational motion thus imparted to pulley 218 causes shaft 166 to rotate. Gear 176 on shaft 166 rotates gear 172 and shaft 170, which in turn rotates gear 174 to cause the rotation of gear 182 and shaft 180. Shaft 180 then effects the rotation of the drive shaft 200, which in turn effects the rotation of auger shaft 194 in the loader 186 in the manner described above. The use of the two gears 172 and 174 on shaft 170 equalizes the thrust load on the shaft and there is therefore no need for a thrust bearing on the idler shaft to counter the thrust of the gears 176 and 182.

The supply of ear corn, for example, into the intake chute 24 (FIG. 1) is controlled by the control handle 236 on the supply loader 186. The ear corn is directed to the intake passage 70 (FIG. 16) between screen 30 and rotor 59 by baffle plate 58 and the sloping bottom of chute 24. The cutting bars 66 and shear bar 68 preliminarily crush the ear corn cobs against the interior surface of screen 30 and cutting bars 38 thereon. As the particles of crushed feed are thrown toward the center 70 of the passageway, the depth thereof decreases as the clearance between the rotor 59 and the screen 30 becomes narrower. However, beyond point 70, the passageway becomes progressively greater until at the discharge point 74, the clearance between the screen 30 and rotor 59 is substantially that of the point of entry 70. This unique passageway of progressively narrower width and thence progressively greater width results in an extremely efficient cutting action, wherein the material is more readily drawn into the cutting area, is more efficiently crushed, and then is easily and quickly discharged from the upper portion of the screen. The tension and position of the screen 30 can be adjusted in the manner described above, and the screen can also be removed as indicated above for cleaning or for replacement by a screen of different size.

As the particles of corn and corn cobs are repeatedly churned through the above described passageway, the particles which are smaller than the perforations in the screen 30 move through the perforations and downward onto the rolls 78 and 80 which are rotating in opposite directions to each other. The material is then more finely ground or crushed to a degree depending on the predetermined spaced setting of the rolls. Again, if the rolls are not to be used, the control lever 117 can be moved to the lower position of FIG. 19 and the rolls can be separated without disturbing the predetermined fine operational spacing thereof. If any foreign dense material passes through the rolls, such as particles of steel, the rolls will spread apart in the manner indicated.

The crushed particles of feed move downwardly from between rolls 78 and 80 to the V-shaped bottom 22 of compartment 16, wherein it is carried by augers 152 and 268 to a point of discharge. The compartments 258 in elbow tubes 246 and 246B serve to keep the gears 269 free from the feed material and yet a clear passageway 263 is left for the feed. Removable plate 256 assists in servicing the gears, if necessary.

It is therefore seen from the foregoing that the device of this invention is a highly efficient roller mill which performs well and which is easily placed in operation. The fine adjustment on the rolls can be made and maintained even though the rolls are periodically moved to an inoperative position. Thus, from the foregoing it is seen that this invention will accomplish at least all of its stated objectives.

Some changes may be made in the construction and arrangement of our roller mill without departing from the real spirit and purpose of our invention, and it is our intention to cover by our claims, any modified forms of structure or use of mechanical equivalents which may be reasonably included within their scope.

We claim:
1. In a roller mill,
a substantially vertical compartment,
a screen means in the upper portion of said compartment,
a rotor in said compartment adjacent said screen,
a supporting member,
a supply loader including a material conveying means having one end on said supporting member adjacent the top of said compartment,
a vertical shaft pivotally connecting said supporting member to said compartment,
a first horizontal shaft on said compartment,
means operatively connecting said first horizontal shaft to said rotor,
gear means on said first horizontal shaft in mesh with a first gear on said vertical shaft,
a second horizontal shaft on said supporting member,
gear means on said second horizontal shaft in mesh with a second gear on said vertical shaft,
and means operatively connecting said second horizontal shaft with said material conveying means of said supply loader.

2. The structure of claim 1 wherein said compartment has an intake chute at its upper portion and said supporting member is pivotally secured to said compartment adjacent said chute so that said supply loader has its upper end positioned adjacent said chute throughout the pivotal movement of said supporting member.

3. In a power transmission means,
a supporting means,
a power shaft rotatably mounted on said supporting means,
a supporting element,
a vertical shaft pivotally connecting said supporting element to said supporting means,
a first gear on said vertical shaft,
means operatively connecting said first gear and said power shaft including a horizontal shaft on said supporting means with a gear in mesh with the first gear on said vertical shaft,
a horizontal shaft rotatably mounted on said supporting element,
a second gear on said vertical shaft and in mesh with a gear on said horizontal shaft.
means on said horizontal shaft for connection with an auxiliary power shaft,
said supporting means including a first channel member, and said supporting element being a second channel member pivotally connected to said first channel member by said vertical shaft, said first and second channel members in nesting end to end registry with each other and said vertical shaft extending through the flanges of the adjacent ends of said first and second channel members.

References Cited
UNITED STATES PATENTS

| | | | |
|---|---|---|---|
| 667,465 | 2/1901 | Seeger et al. | 74—385 |
| 717,028 | 12/1902 | Redfield | 74—385 |
| 730,524 | 6/1903 | Downie | 74—385 |
| 995,322 | 6/1911 | Bullard | 74—385 |
| 2,235,427 | 3/1941 | Harris | 74—385 |
| 2,764,899 | 10/1956 | West | 74—385 |

W. GRAYDON ABERCROMBIE, *Primary Examiner.*